(12) United States Patent
Obara

(10) Patent No.: US 6,597,652 B2
(45) Date of Patent: Jul. 22, 2003

(54) OPTICAL PICKUP MOVING MECHANISM

(75) Inventor: Masato Obara, Tokyo (JP)

(73) Assignee: Alpine Electronics, Inc., Tokyo (JP)

( * ) Notice: Subject to any disclaimer, the term of this patent is extended or adjusted under 35 U.S.C. 154(b) by 104 days.

(21) Appl. No.: 09/805,851

(22) Filed: Mar. 14, 2001

(65) Prior Publication Data

US 2001/0038600 A1 Nov. 8, 2001

(30) Foreign Application Priority Data

Mar. 29, 2000 (JP) .......................................... 2000-091704

(51) Int. Cl.[7] ................................................ G11B 21/16
(52) U.S. Cl. ......................................... 369/249; 369/219
(58) Field of Search ................................. 369/219, 244, 369/246, 249, 245, 247

(56) References Cited

U.S. PATENT DOCUMENTS

| | | | |
|---|---|---|---|
| 5,682,282 A | 10/1997 | Kato | 360/106 |
| 5,933,406 A | * 8/1999 | Ikegame | 369/219 |
| 5,933,407 A | * 8/1999 | Watanabe et al. | 359/823 |
| 6,046,974 A | * 4/2000 | Uehara | 369/219 |

FOREIGN PATENT DOCUMENTS

| | | | | |
|---|---|---|---|---|
| JP | 62057130 A | * | 3/1987 | G11B/7/09 |
| JP | 02154854 A | * | 6/1990 | F16H/25/24 |

* cited by examiner

Primary Examiner—William Korzuch
Assistant Examiner—Mark Blouin
(74) Attorney, Agent, or Firm—Brinks Hofer Gilson & Lione

(57) ABSTRACT

An optical pickup moving mechanism including an optical pickup and a movement guide member. The optical pickup has a base with an objective lens mounted thereon and with a to be guided portion being projected sideways thereof. The movement guide member has a guide surface which is extended in a predetermined direction and supporting the base slidably through the to be guided portion. The base is operable to slid along the guide surface of the movement guide member, thereby allowing the optical pickup to move radially of a disc. According to this construction, it is possible to attain the reduction of cost and weight of the optical pickup moving mechanism and suppress the growth of wear caused by sliding contact of the base and the movement guide member with each other, thus ensuring high reliability.

23 Claims, 4 Drawing Sheets

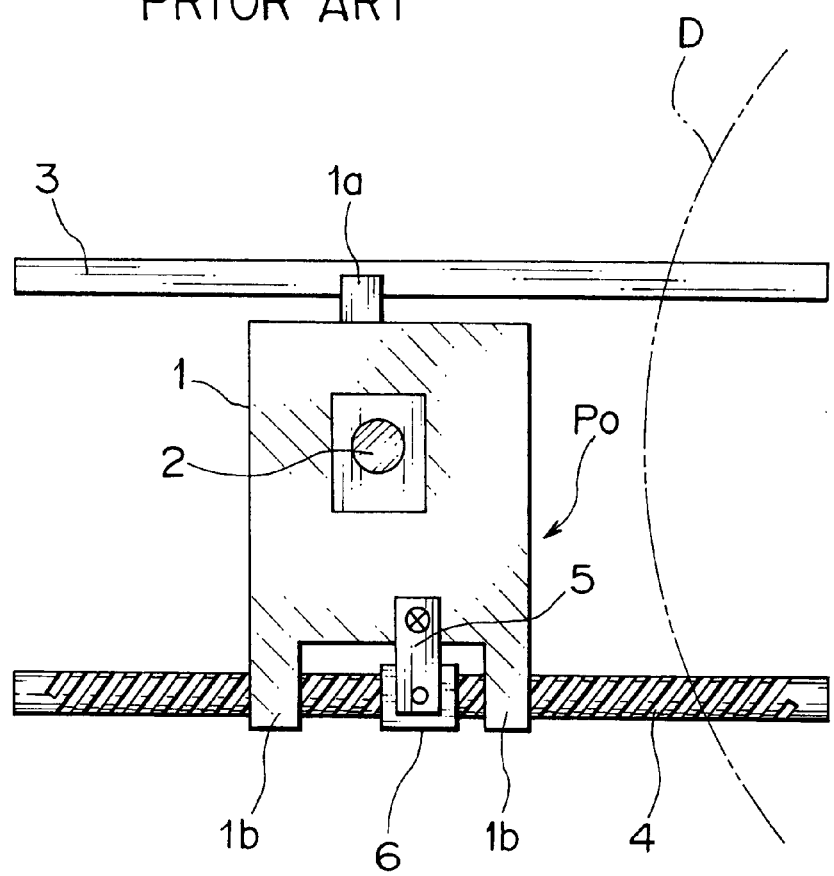

OPTICAL PICKUP MOVING MECHANISM

BACKGROUND OF THE INVENTION

1. Field of the Invention

The present invention relates to a mechanism for moving an optical pickup radially along a disc. Particularly, the invention is concerned with an optical pickup moving mechanism suitable for the reduction of cost and weight.

2. Description of the Prior Art

In a disc unit which, with use of an optical pickup, records and reproduces information to and from a disc such as CD (compact disc), MD (minidisc), or DVD (digital versatile disc), an optical pickup moving mechanism as shown in FIG. 7 is provided for moving the optical pickup radially along the disc.

In the same figure, an optical pickup P0 is principally composed of an objective lens 2, a drive mechanism (not shown) for actuating the objective lens 2, and a base 1 which carries thereon the objective lens 2, the objective lens drive mechanism and an optical device for radiating a laser beam to a disc D through the objective lens 2. The base 1 is disposed between a guide shaft 3 and a screw shaft 4. The guide shaft 3 and the screw shaft 4 are arranged in an opposed parallel relation to each other on a mechanical chassis (not shown). The screw shaft 4 is rotated in both forward and reverse directions by means of a thread motor (not shown). Bearing portions 1a and 1b as portions to be guided are projected from both sides of the base 1. One bearing portion 1a is in abutment against a peripheral surface of the guide shaft 3, while the other bearing portions 1b are loosely fitted on the screw shaft 4. A plate spring 5 is screwed in a cantilevered fashion to the base 1 and a female screw member 6 called half nut is fixed to a free end side of the plate spring 5. The female screw member 6 is toothed over an approximately semicircle. This toothed portion remains in contact with the threaded portion of the screw shaft 4 due to the resilience of the plate spring 5.

In the optical pickup transfer mechanism thus roughly constructed, when the screw shaft 4 is rotated in either forward or reverse direction, the rotational force thereof is converted to a linear motion and transferred to the base 1 by means of the female screw member 6, so that the base 1 moves in the thrust direction (right and left direction in FIG. 7) of the guide shaft 3 and the screw shaft 4. As a result, the whole of the optical pickup 2 is moved radially along the disc D through the base 1, thus permitting information recording and reproducing operations for the disc.

Recently, for promoting the reduction of cost and weight of the optical pickup moving mechanism, studies have been made about a technique wherein the base of the optical pickup is formed by molding a synthetic resin instead of using such a metallic material as die casting aluminum, and the guide shaft is formed by molding a synthetic resin as a substitute for a metallic shaft such as a stainless steel shaft. If, however, the base and the guide shaft are each formed by molding a synthetic resin, the bearing portion of the base, which is always kept in sliding contact with the guide shaft at the same portion thereof, becomes worn-out. This may result in tilting of an optical axis of the objective lens mounted on the base, which deteriorates the recording or reproducing function.

In the case of a vehicular disc unit, it is necessary to select a material superior in both rigidity and heat resistance. With a synthetic resin material, PPS (polyphenylene sulfide) with glass fibers incorporated therein is used. If both base and guide shaft repeat sliding, their constituent synthetic resins are apt to wear more rapidly. Such a problem is also true of the case where the screw shaft as the other movement guide member is formed by molding a synthetic resin.

BRIEF SUMMARY OF THE INVENTION

The present invention has been accomplished in view of the above-mentioned circumstances and it is an object of the invention to provide an optical pickup moving mechanism wherein even if a base of an optical pickup and a movement guide member are each formed from a synthetic resin, it is possible to suppress the growth of wear caused by sliding contact between their constituent synthetic resins, and which can attain the reduction of cost without impairing the reliability.

According to the present invention, for achieving the above-mentioned object, there is provided an optical pickup moving mechanism including an optical pickup and a movement guide member, the optical pickup having a base with an objective lens mounted thereon and with a to be guided portion being projected sideways thereof, the movement guide member having a guide surface which is extended in a predetermined direction and supporting the base slidably through the to be guided portion, the base being slid along the guide surface of the movement guide member, thereby allowing the optical pickup to move radially of a disc, wherein the to be guided portion and the movement guide member are each formed from a synthetic resin and a metallic slide member is disposed in the to be guided portion at a position opposed to the guide surface so that an outer peripheral surface of the slide member comes into sliding contact with the guide surface.

According to the optical pickup moving mechanism of the above construction, since the base which includes the to be guided portion and the movement guide member which supports the base slidably are each formed by molding a synthetic resin, it is possible to attain the reduction of cost and weight, and since the metallic slide member disposed in the to be guided portion is brought into sliding contact with the guide surface of the movement guide member, it is possible to suppress the growth of wear caused by sliding contact between their constituent synthetic resins and hence possible to ensure a high reliability.

In the above optical pickup moving mechanism, by disposing a resilient member for urging the to be guided portion in a direction in which the slide member comes into pressure contact with the guide surface of the movement guide member, the slide member is allowed to slide on the guide surface always under a moderate pressing force without leaving the guide surface.

It is preferable that the slide member be a metal pin of a generally circular section. As such a metal pin of a generally circular section there may be used, for example, a commercially available parallel pin made of stainless steel which is inexpensive and high in dimensional accuracy. Thus, it is not necessary to newly provide a special mold for the metal pin; in other words, the metal pin itself does not become a cause of increase in cost. If the metal pin of a generally circular section is reciprocated in the optical pickup moving direction while being kept in sliding contact with the guide surface of the movement guide member, lubricating oil (grease) applied to the guide surface stays in wedge-like gaps formed before and behind the sliding contact position of the metal pin, thereby functioning as grease sumps and thus giving rise to an advantage that a smooth sliding motion of the metal pin is ensured.

In connection with the above optical pickup moving mechanism, if there is adopted a structure wherein a recess is formed in the to be guided portion at a position opposed to the guide surface and the metal pin is fitted in the recess, the metal pin mounting workability for the to be guided portion is improved. Further, if the recess is formed with a flat inner bottom surface and is narrower on its side close to the guide surface and if the metal pin is fitted in the recess while its outer peripheral surface is brought into abutment against the inner bottom surface of the recess, the metal pin can be fitted in the recess with the inner bottom surface of the recess as a reference. Here, the position of the bottom surface can be easily defined relative to the guide surface. This allows for improved relative positional accuracy between the metal pin and the guide surface and easier dimensional management in a design stage or in an assembling stage.

In connection with the above optical pickup transfer mechanism, if a through hole is formed in the to be guided portion so as to communicate with the recess and open to a side of the metal pin which side is not opposed to the guide surface, and if an adhesive is poured from this through hole into the recess to fix the metal pin within the recess, the metal pin fitted in the recess can be fixed firmly to the to be guided portion with the adhesive by using a slight force. Additionally, the assembling work efficiency can be improved because there is no fear that the adhesive may adhere to the guide surface side of the metal pin.

Preferably, the metal pin is disposed so that its longitudinal direction is substantially orthogonal to the extending direction of the guide surface. According to this arrangement, the base can be moved while keeping the contact area between the metal pin and the guide surface to a minimum, so that the sliding resistance between the metal pin and the guide surface becomes extremely small and hence it is possible to prevent the occurrence of such an inconvenience as the metal pin is caught on the guide surface during movement of the optical pickup and tilting of the optical pickup results. For example, if the guide surface of the movement guide member is arcuate in section, then by disposing a metal pin in a direction approximately orthogonal to a generator of the circular arc it is made possible to maintain the metal pin and the guide surface in a state of point contact.

BRIEF DESCRIPTION OF SEVERAL VIEWS OF THE DRAWINGS

FIG. 7 is a plan view for explaining an outline of a prior art optical pickup moving mechanism.

DETAILED DESCRIPTION OF THE INVENTION

Figure 1:
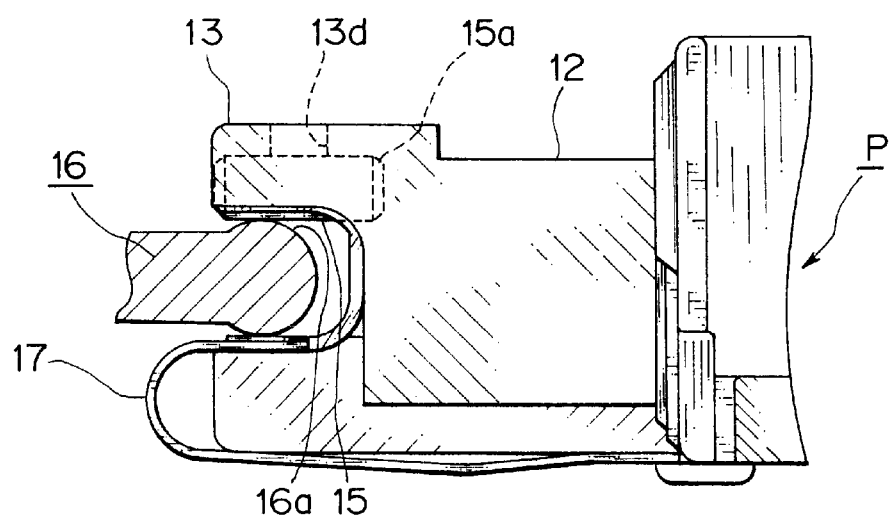
FIG. 1 is a front view of a principal portion, showing an engaged state of one side portion of a base with a movement guide member according to an embodiment of the present invention.

An embodiment of the present invention will be described hereinafter with reference to the accompanying drawings.

An optical pickup P shown in FIGS. 1 to 6 is provided with a base 12. An objective lens 10, a drive mechanism (not shown) for the objective lens, and an optical device that radiates a laser beam to a disc D (see FIG. 7), are mounted on the base 12. The whole of the base 12, including bearing portions 13 and 14 projecting from both side portions of the base, is formed from a synthetic resin. A metal pin 15, preferably of a circular section (cylindrical), is attached to the bearing portion 13. The bearing portions 13 and 14 are to be guided portions. The bearing portion 13 is engaged with a guide member (a movement guide member) 16 made from a synthetic resin such as PPS and having a generally cylindrical (sectionally arcuate) guide surface 16a formed at a tip end thereof. The other bearing portions 14 are loosely fitted on a screw shaft (not shown). The screw shaft is rotated in both forward and reverse directions by means of a thread motor (not shown), whereby the base 12 is moved in the right and left directions in FIGS. 2 and 3.

A recess 13a is formed in the bearing portion 13 of the base 12 at a position opposed to the guide surface 16a of the guide member 16, the recess 13a extending in a direction orthogonal to the extending direction (generator direction) of the guide surface 16a. The recess 13a is formed so as to be flat at an inner bottom surface 13b thereof and narrower on its side close to the guide surface 16a. The cylindrical metal pin 15 fitted in the recess 13a is established its position by abutment of its outer peripheral surface against the inner bottom surface 13b and is designed so that its lower end portion illustrated in the drawings is projected a predetermined amount from the recess 13a. A generally U-shaped plate spring (a resilient member) 17 is fixed to a bottom side of one side portion of the base 12. A free end portion of the plate spring 17 is in pressure contact with an underside in the figures of the guide member 16, and with a reaction force thereof the bearing portion 13 (base 12) is urged in a direction in which the metal pin 15 comes into pressure contact with the guide surface 16. Thus, the guide member 16 comes to be gripped between the metal pin 15 and the free end portion of the plate spring 17, and the metal pin 15 slide on the guide surface 16 while being kept in pressure contact with the guide surface 16a. Since the recess 13a is open in one longitudinal end portion thereof (end face side of the bearing portion 13), the metal pin 15 can be inserted through this opening portion into the recess 13a. In this case, the insertion of the metal pin 15 into the recess 13a can be done smoothly without being caught in the opening portion because the peripheral edge of the opening portion and both longitudinal end faces of the metal pin 15 are chamfered as chamfered portions 13c and 15a. Further, on an upper surface side of the bearing portion 13 is formed a through hole 13d which connects with the recess 13a and which is open to an upper end side (the side not opposed to the guide surface 16a) of the metal pin 15 in FIG. 1. An adhesive 18 is poured into the recess 13a from the through hole 13d so that the recess 13a is filled with the adhesive, whereby the metal pin 15 located within the recess 13a is fixed firmly.

Like the optical pickup P0 shown in FIG. 7, on the other bearing portions 14 side of the base 12 there are mounted a female screw member connected with a threaded portion of a screw shaft and a plate spring for imparting a biasing force to the female screw member.

Thus, in this embodiment, since the base 12 which includes the bearing portions 13 and 14 and the guide member 16 which supports the base 12 slidably through the bearing portion 13 are each formed by molding a synthetic resin, the optical pickup moving mechanism using them are inexpensive and light-weight. In this case, the bearing portion 13 is not brought into direct sliding contact with the guide surface 16a of the guide member 16, but the outer peripheral surface of the metal pin 15 fitted and fixed into the recess 13a of the bearing portion 13 is brought into sliding contact with the guide surface 16a, so it is possible to suppress the growth of wear which may be marked in case of sliding contact of synthetic resins with each other. Thus, the optical pickup P is reliable high enough to ensure its movement in a stable posture over a long period.

The metal pin 15 of a circular section, such as a cylindrical shape, to be fitted in the recess 13a may be a commercially available parallel pin made of stainless steel which is inexpensive and high in dimensional accuracy. In this case, it is not necessary to use a mold for the manufacture of the metal pin. Therefore, the metal pin 15 itself does not become a cause of increase in cost.

Figure 2:
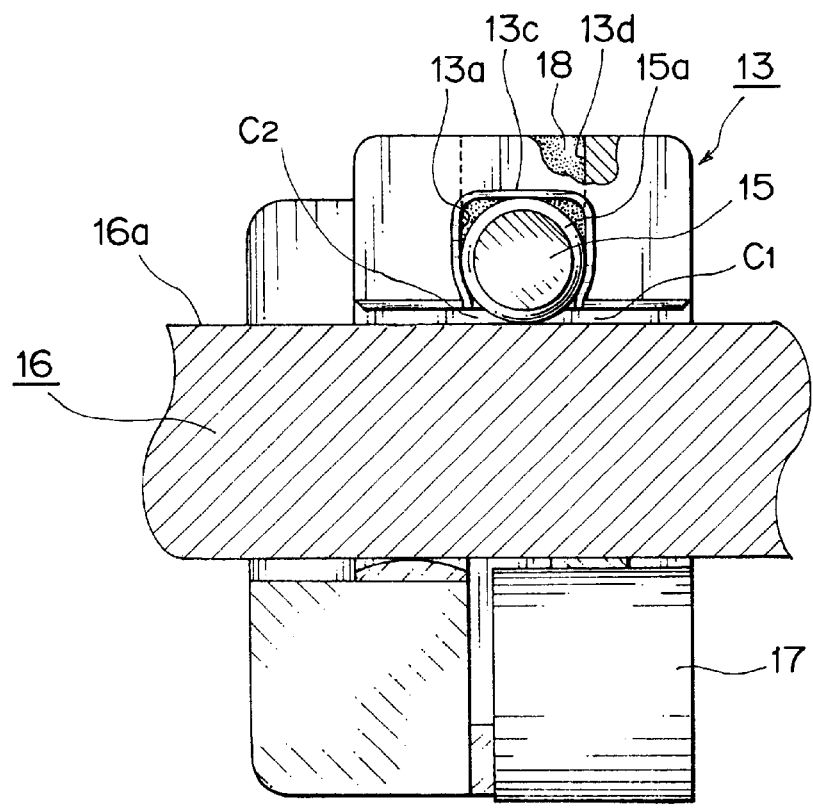
FIG. 2 is a side view thereof.
Figure 3:
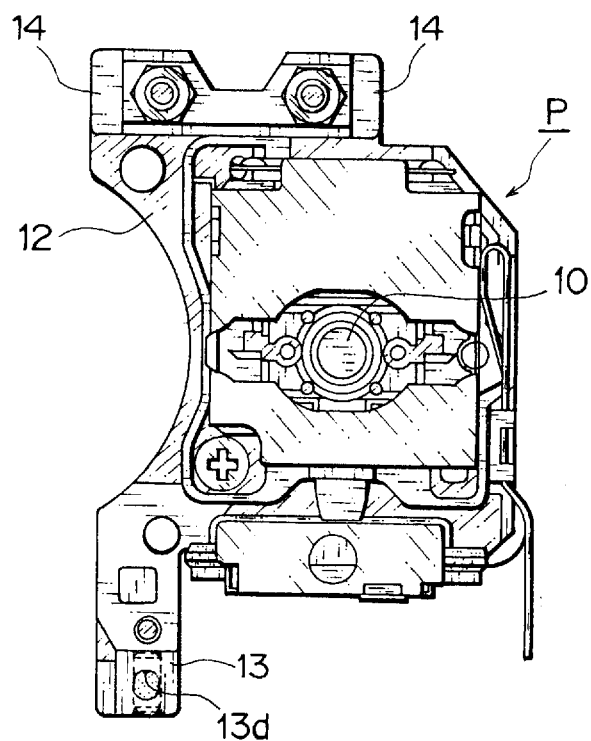
FIG. 3 is a plan view of the whole of an optical pickup.
Figure 4:
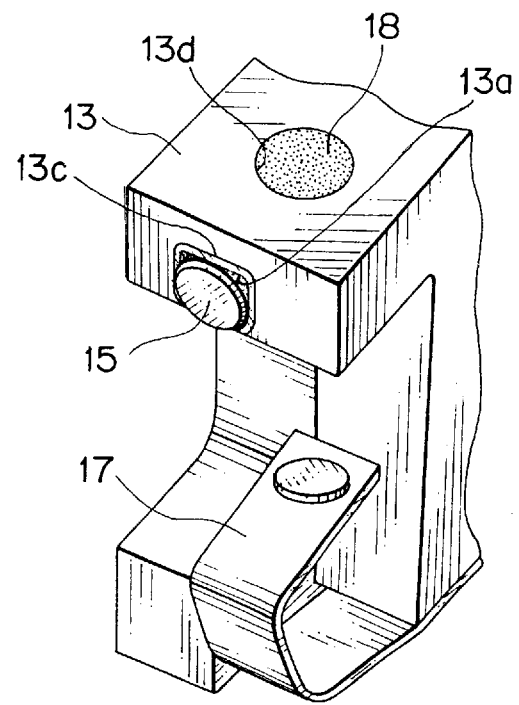
FIG. 4 is a perspective view of one side portion of the base.
Figure 5:
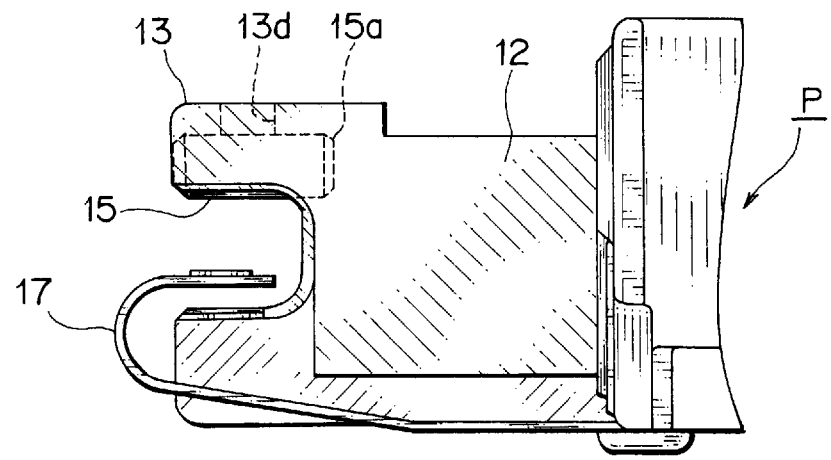
FIG. 5 is a front view thereof.
Figure 6:
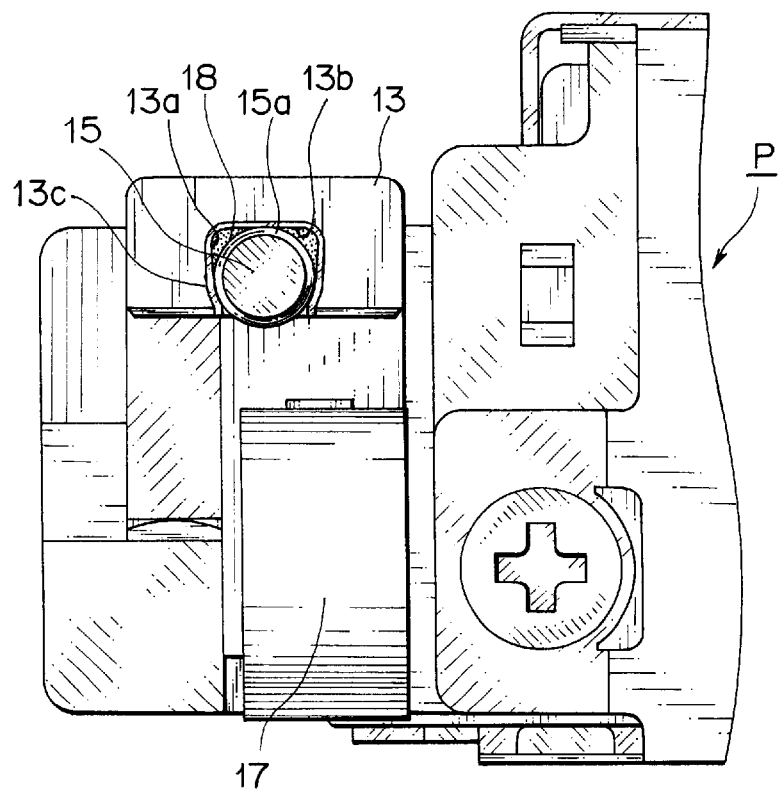
FIG. 6 is a side view thereof.

If the base 12 is reciprocated in the pickup moving direction while the metal pin 15 of a cylindrical shape is kept in sliding contact with the guide surface 16a of the guide member 16, lubricating oil (grease) (not shown) applied to the guide surface 16a will stay in wedge-like gaps C1 and C2 (see FIG. 2). These wedge-like gaps C1 and C2 are formed before and behind the position at which the metal pin 15 is in sliding contact with the guide surface. Thus, the gaps C1 and C2 function as grease sumps. For this reason it is less likely that there will be a lack of lubricating oil at the sliding contact position of the metal pin 15, and the metal pin 15 will slide smoothly with respect to the guide surface 16a.

In this embodiment, the metal pin 15 fitted in the recess 13a comes into abutment against the flat inner bottom surface 13b of the recess 13a. The metal pin 15 is positioned thereby, if the flat inner bottom surface 13b, whose relative position with respect to the guide surface 16a is easy to be defined, is used as a reference and the metal pin 15 is fitted into the recess 13a. It also becomes easier to enhance the relative positional accuracy between the metal pin 15 and the guide surface 16a. Hence, the dimensional management in the design stage and the assembling stage is simplified.

In this embodiment, moreover, since the through hole 13d is formed in the bearing portion 13 so as to connect with the recess 13a and open to the upper end portion (the side not opposed to the guide surface 16a) of the metal pin 15 and the metal pin 15 fitted in the recess 13a can be bonded and fixed to the bearing portion 13 with the adhesive 18 poured into the recess from the through hole 13d, a working procedure comprising pushing the metal pin 15 into the recess 13a with a slight force such as a finger-tip force, fixing it therein temporarily and then fixing the metal pin 15 firmly with the adhesive 18 may be used. Thus, because it is not necessary to mount the metal pin 15 by press-fitting, the metal pin can be mounted without impairing the assembling workability and without deforming the inner surface of the recess 13a. In this embodiment, moreover, one longitudinal end portion of the recess 13a is open, the metal pin 15 can be inserted straight from this opening portion into the recess 13a, and the chamfered portions 15a and 13c are formed so as to prevent the end face of the metal pin 15 from being caught on the peripheral edge of the opening portion when the metal pin is inserted into the recess. Therefore, the assembling work for insertion of the metal pin 15 into the recess 13a can be done in an extremely simple manner.

It is not always necessary for the metal pin 15 to be disposed in a direction orthogonal to the extending direction (generator direction) of the guide surface 16a. It is, however, preferable that the longitudinal direction of the metal pin 15 (longitudinal direction of the recess 13a) is orthogonal to the extending direction of the guide surface 16a as in this embodiment because the metal pin 15 and the guide surface 16a can be maintained in a state of point contact. More particularly, the smaller or larger than 90° the angle between the longitudinal direction of the metal pin 15 and the extending direction of the guide surface 16a, the closer to a state of line contact the metal pin 15 and the guide surface 16a and the more likely the occurrence of variations in contact position and increase of the sliding resistance. Consequently, there may occur such an inconvenience as tilting in posture of the optical pickup P during movement or an increase in load of the thread motor. But there is no fear of occurrence of such an inconvenience if both metal pin 15 and guide surface 16a are held in a state of point contact.

According to an embodiment of the present invention, as set forth above, cost and weight may be reduced because the base and the movement guide member may be formed by molding a synthetic resin. The to be guided portion and the base are not brought into direct sliding contact with each other, but a metallic slide member provided on the to be guided portion side typically is brought into sliding contact with the guide surface. Thus, in an embodiment of the present invention, the development of wear, which may occur in case of sliding contact of synthetic resins with each other, is suppressed. Accordingly, it is possible to provide an optical pickup moving mechanism which is highly reliable and less expensive.

What is claimed is:

1. An optical pickup moving mechanism comprising:
   an optical pickup having a base with an objective lens mounted thereon;
   a metal pin connected with said base; and
   a movement guide member formed from a synthetic resin having a guide surface, said movement guide member supporting said base by allowing said metal pin to slide along said guide surface of said movement guide member.

2. The optical pickup moving mechanism of claim 1 further comprising a resilient member operable for maintaining contact between said metal pin and said guide surface.

3. The optical pickup moving mechanism of claim 1 wherein a longitudinal axis of said metal pin is substantially orthogonal to an extending direction of said guide surface.

4. The optical pickup moving mechanism of claim 1 wherein said metal pin has a generally circular section.

5. The optical pickup moving mechanism of claim 1 further comprising a recess in said base operable to receive said metal pin.

6. The optical pickup moving mechanism of claim 5 wherein said recess is formed with a flat inner bottom surface and narrower portion adjacent to said guide surface such that said metal pin may be fitted in said recess while allowing an outer peripheral surface to be in abutment with said flat inner bottom surface.

7. The optical pickup moving mechanism of claim 5 further comprising a hole in said base operable to receive adhesive operable to hold said metal pin within said recess.

8. The optical pickup moving mechanism of claim 1 wherein said guide surface of said movement guide member is curved in section.

9. An optical pickup moving mechanism comprising:
   an optical pickup having a base formed from a synthetic resin with an objective lens mounted thereon;
   a metal pin connected with said base; and
   a movement guide member formed from a synthetic resin having a guide surface, said movement guide member supporting said base by allowing said metal pin to slide along said guide surface of said movement guide member.

10. The optical pickup moving mechanism of claim 9 further comprising a resilient member operable for maintaining contact between said metal pin and said guide surface.

11. The optical pickup moving mechanism of claim 9 wherein a longitudinal axis of said metal pin is substantially orthogonal to an extending direction of said guide surface.

12. The optical pickup moving mechanism of claim 9 wherein said metal pin has a generally circular section.

13. The optical pickup moving mechanism of claim 9 further comprising a recess in said base operable to receive said metal pin.

14. The optical pickup moving mechanism of claim 13 wherein said recess is formed with a flat inner bottom surface and narrower portion adjacent to said guide surface such that said metal pin may be fitted in said recess while allowing an outer peripheral surface to be in abutment with said flat inner bottom surface.

15. The optical pickup moving mechanism of claim 13 further comprising a hole in said base operable to receive an adhesive operable to hold said metal pin within said recess.

16. The optical pickup moving mechanism of claim 9 wherein said guide surface of said movement guide member is curved in section.

17. An optical pickup moving mechanism comprising:

an optical pickup having a base with an objective lens mounted thereon;

a metal pin connected with said base;

a movement guide member formed from a synthetic resin having a guide surface, said movement guide member supporting said base by allowing said metal pin to slide along said guide surface of said movement guide member; and a resilient member operable for maintaining contact between said metal pin and said guide surface.

18. The optical pickup moving mechanism of claim 17 wherein said guide surface of said movement guide member is curved in section.

19. The optical pickup moving mechanism of claim 17 wherein said metal pin has a generally circular section.

20. The optical pickup moving mechanism of claim 17 wherein a longitudinal axis of said metal pin is substantially orthogonal to an extending direction of said guide surface.

21. The optical pickup moving mechanism of claim 17 further comprising a recess base operable to receive said metal pin.

22. The optical pickup moving mechanism of claim 21 wherein said recess is formed with a flat inner bottom surface and narrower portion adjacent to said guide surface such that said metal pin may be fitted in said recess while allowing an outer peripheral surface to be in abutment with said flat inner bottom surface.

23. The optical pickup moving mechanism of claim 21 further comprising a hole in said base operable to receive adhesive operable to hold said metal pin within said recess.

* * * * *

UNITED STATES PATENT AND TRADEMARK OFFICE
CERTIFICATE OF CORRECTION

PATENT NO. : 6,597,652 B2
DATED : July 22, 2003
INVENTOR(S) : Masato Obara

It is certified that error appears in the above-identified patent and that said Letters Patent is hereby corrected as shown below:

Column 8,
Line 2, insert -- in said -- before "base".

Signed and Sealed this

Sixth Day of July, 2004

JON W. DUDAS
*Acting Director of the United States Patent and Trademark Office*